(12) United States Patent
Riley et al.

(10) Patent No.: US 8,903,059 B2
(45) Date of Patent: *Dec. 2, 2014

(54) METHODS, SYSTEMS, AND COMPUTER READABLE MEDIA FOR SERVICE DATA FLOW (SDF) BASED SUBSCRIPTION PROFILE REPOSITORY (SPR) SELECTION

(75) Inventors: Yusun Kim Riley, Weston, MA (US); Sundaram Rajagopalan, Waltham, MA (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 159 days.

This patent is subject to a terminal disclaimer.

(21) Appl. No.: 13/249,221

(22) Filed: Sep. 29, 2011
(Under 37 CFR 1.47)

(65) Prior Publication Data

US 2012/0224677 A1 Sep. 6, 2012

Related U.S. Application Data

(60) Provisional application No. 61/390,164, filed on Oct. 5, 2010.

(51) Int. Cl.
| | | |
|---|---|---|
| *H04M 11/00* | (2006.01) | |
| *H04M 15/00* | (2006.01) | |
| *H04L 12/14* | (2006.01) | |

(52) U.S. Cl.
CPC ........... *H04L 12/1407* (2013.01); *H04M 15/66* (2013.01)
USPC ....................................... 379/93.01; 370/467

(58) Field of Classification Search
USPC ......... 709/223, 224, 226, 227, 206, 228, 229; 379/93.01
See application file for complete search history.

(56) References Cited

U.S. PATENT DOCUMENTS

| | | | |
|---|---|---|---|
| 8,605,132 B1* | 12/2013 | Swanson et al. ........... | 348/14.01 |
| 2006/0034329 A1* | 2/2006 | Miller et al. .................. | 370/467 |
| 2007/0185743 A1* | 8/2007 | Jinks ................................ | 705/4 |
| 2007/0242692 A1* | 10/2007 | Limb et al. ..................... | 370/465 |
| 2007/0286117 A1* | 12/2007 | Balasubramanian et al. | 370/328 |
| 2008/0271113 A1* | 10/2008 | Belling ............................ | 726/1 |
| 2010/0125894 A1* | 5/2010 | Yasrebi et al. ..................... | 726/4 |
| 2010/0293543 A1* | 11/2010 | Erhart et al. ....................... | 718/1 |
| 2010/0311444 A1* | 12/2010 | Shi et al. ......................... | 455/466 |
| 2011/0295935 A1* | 12/2011 | Vihtari et al. .................. | 709/203 |
| 2011/0320620 A1* | 12/2011 | Cutler et al. ................... | 709/229 |
| 2012/0023246 A1* | 1/2012 | Castro Castro et al. ...... | 709/229 |

(Continued)

OTHER PUBLICATIONS

"3rd Generation Partnership Project; Technical Specification Group Services and System Aspects; Telecommunication management; Charging management; Diameter charging applications (Release 9)," 3GPP TS 32.299 V9.4.0, pp. 1-148 (Jun. 2010).

(Continued)

*Primary Examiner* — Maria El-Zoobi
(74) *Attorney, Agent, or Firm* — Jenkins, Wilson, Taylor & Hunt, P.A.

(57) ABSTRACT

According to one aspect, the subject matter described herein includes a method for SDF based subscription profile repository selection. The method includes receiving a first signaling message. The first signaling message includes service data flow information for identifying a service data flow. The method also includes selecting, using the service data flow information, an SPR from a plurality of SPRs, the SPR containing policy information associated with the service data flow.

21 Claims, 5 Drawing Sheets

(56) References Cited

U.S. PATENT DOCUMENTS

| | | | |
|---|---|---|---|
| 2012/0036257 A1* | 2/2012 | Mann et al. | 709/224 |
| 2012/0075338 A1* | 3/2012 | Curtis et al. | 345/629 |
| 2012/0233324 A1* | 9/2012 | Zhou et al. | 709/224 |
| 2012/0239816 A1* | 9/2012 | Carnero Ros et al. | 709/227 |
| 2013/0094436 A1* | 4/2013 | Kwan et al. | 370/328 |

OTHER PUBLICATIONS

"3rd Generation Partnership Project; Technical Specification Group Core Network and Terminals; IP Multimedia (IM) Subsystem Sh interface; Signalling flows and message contents (Release 9)," 3GPP TS 29.328 V9.2.0, 1-49 (Jun. 2010).

Znaty, "Diameter, GPRS, (LTE + ePC = EPS), IMS, PCC and SDM," EFORT (May 2010). (Part 1 of 2, pp. 1-229).

Znaty, "Diameter, GPRS, (LTE + ePC = EPS), IMS, PCC and SDM," EFORT (May 2010). (Part 2 of 2, pp. 230-460).

"3rd Generation Partnership Project; Technical Specification Group Core Network and Terminals; Sh Interface based on the Diameter protocol; Protocol details (Release 9)," 3GPP TS 29.329 V9.1.0, pp. 1-21 (Mar. 2010).

"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).

"SDS," Tekelec, Inc., pp. 1-3 (Copyright 2010).

"HSS," Tekelec, Inc., pp. 1-3 (Copyright 2010).

"SDS 3000™ Datasheet," Blueslice Networks Inc., pp. 1-2 (Jan. 2009).

"3rd Generation Partnership Project; Technical Specification Group Services and System Aspects; Policy and charging control architecture (Release 8)," 3GPP TS 23.203 V8.1.1, pp. 1-87 (Mar. 2008).

"3rd Generation Partnership Project; Technical Specification Group Core Network and Terminals; Charging rule provisioning over Gx interface (Release 6)," 3GPP TS 29.210 V6.7.0, pp. 1-21 (Dec. 2006).

* cited by examiner

METHODS, SYSTEMS, AND COMPUTER READABLE MEDIA FOR SERVICE DATA FLOW (SDF) BASED SUBSCRIPTION PROFILE REPOSITORY (SPR) SELECTION

PRIORITY CLAIM

This application claims the benefit of U.S. Provisional Patent Application Ser. No. 61/390,164, filed Oct. 5, 2010, the disclosure of which is incorporated herein by reference in its entirety.

TECHNICAL FIELD

The subject matter described herein relates to policy configuration. More specifically, the subject matter relates to methods, systems, and computer readable media for service data flow (SDF) based subscription profile repository (SPR) selection.

BACKGROUND

Traditionally, control of quality of service (QoS) within telecommunications networks has been achieved using a combination of best-effort data delivery, network resources reservation, or data packet marking on data communication paths. However, the design of emerging next generation network (NGN) architectures (e.g., Internet protocol (IP) multimedia subsystem (IMS) and long term evolution (LTE)) will render this approach no longer viable. One feature of network topology within the various NGNs is that the signaling required to negotiate a data transfer (e.g., application signaling) may not travel on the same logical path as the actual data transfer itself (e.g., data traffic). Therefore, a policy entity is needed to link the application signaling on the service plane to data traffic on the transport plane in order to allow applications to request QoS to be performed on the traffic plane.

One example of such a policy entity is a policy and charging rules function (PCRF). The PCRF, or policy engine, generally is a policy decision point that may be centrally located in the network and may communicate with access edge devices (e.g., policy enforcement points), applications, and operational support systems/business support systems (OSS/BSS) platforms to manage subscriber and network information according to policy rules. These policy rules may be used to define how broadband network resources should be allocated to subscribers and applications and under what conditions. Policy rules may encompass the business and technological rules that govern which network services a subscriber can access, at what bandwidth level, when, and for how long. The PCRF may identify appropriate policy rules by querying a subscription profile repository (SPR) for relevant policy information.

Some policy and charging control (PCC) architectures allow the PCRF to interact with several SPRs. These multi-SPR systems typically operate under the assumption that policy information for a subscriber is to be found in its entirety at a single SPR and is indexed or accessed by a subscriber identifier, such as a mobile subscriber ISDN number (MSISDN). As a result, the set of policy rules applied to the subscriber is always controlled by the same entity and is independent of the services or network that the subscriber is accessing.

Accordingly, in light of these difficulties, a need exists for methods, systems, and computer readable media for service data flow (SDF) based SPR selection.

SUMMARY

According to one aspect, the subject matter described herein includes a method for service data flow (SDF) based subscription profile repository (SPR) selection. The method includes receiving a first signaling message. The first signaling message includes SDF information for identifying an SDF. The method also includes selecting, using the SDF information, an SPR from a plurality of SPRs, the SPR containing policy information associated with the service data flow.

A system for SDF based SPR selection is also disclosed. The system includes a communications interface configured to receive a first signaling message. The first signaling message includes SDF information for identifying an SDF. The system also includes an SPR selection module configured to select, using the SDF information, an SPR from a plurality of SPRs, the SPR containing policy information associated with the SDF.

The subject matter described herein for SDF based SPR selection may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for service data flow (SDF) based subscription profile repository (SPR) selection. As mentioned above, conventionally, an SPR serves as a policy information database for particular users and is queried by the policy and charging rules function (PCRF) for a profile of a specific user. Advantageously, the present subject matter described herein provides selecting SPRs using SDF information. For example, SDF information may include an SDF identifier. An SDF identifier may be used for identifying a service or application associated with an SDF (e.g., one or more related packets). In this example, each SPR may be associated with unique SDF identifiers. When policy information is requested for a particular SDF identifier, an appropriate SPR may be selected (e.g., using the SDF identifier as a lookup in SPR selection table) and queried for policy information.

By applying the subject matter described herein, SPRs can be provisioned in a more flexible and efficient manner. For example, where SPRs are selected using SDF identifiers, SPRs can maintain SDF-specific and/or network-specific policy information. As such, the present subject matter described herein can allow network operators to manage policy, quota, and access criteria for different content delivery networks by storing policy information in different SPRs, where appropriate SPRs are selected using SDF identifiers. In contrast to conventional architectures where each SPR contains complete policy information for a subscriber and a PCRF must contact an SPR, retrieve the complete policy information for the subscriber, and determine relevant policy information, the subject matter described herein can allow a PCRF to quickly select an SPR and obtain relevant policy information from the SPR for the SDF that is to be policed.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
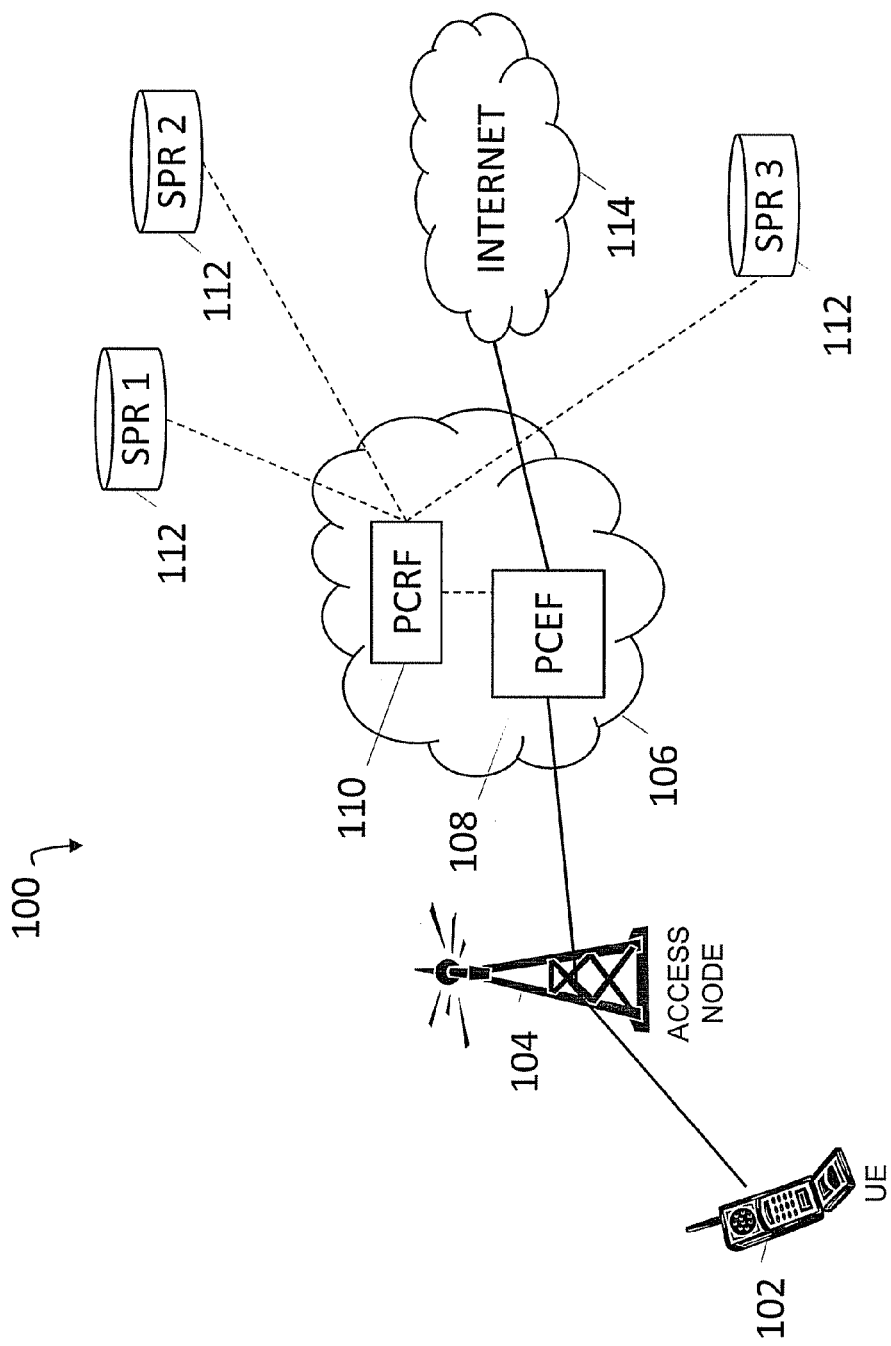
FIG. 1 is a network diagram showing an exemplary network for service data flow (SDF) based subscription profile repository (SPR) selection according to an embodiment of the subject matter described herein.

FIG. 1 is a network diagram showing an exemplary network for SDF based subscription profile repository (SPR) selection according to an embodiment of the subject matter described herein. FIG. 1 is a block diagram illustrating an exemplary communications network 100 according to an embodiment of the subject matter described herein. Referring to FIG. 1, network 100 may include user equipment (UE) 102, an access node (AN) 104 (e.g., a base transceiver station (BTS) or evolved node b (e node b)), a core network 106, and Internet 114.

UE 102 represents a device, such as a mobile handset, for communicating with one or more portions of network 100. For example, UEs 102 may include a computer, a pager, a smartphone, a phone, a wireless modem, a hotspot, a computing platform, a mobile handset, and other subscriber devices.

UE 102 may communicate with access node 104. Access node 104 may be located within an access network (not shown). An access network may include nodes, functions, devices, and/or components for providing a UE 102 access to services, functions, or devices in one or more networks (e.g., core network 106). For example, an access network may include a radio access network (RAN) or other access network, such as a Global System for Mobile Communications (GSM) RAN (GRAN), a GSM enhanced data rates for GSM evolution (EDGE) RAN (GERAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an Evolution-Data Optimized (EV-DO), a wideband CDMA (WCDMA) network, a High Speed Packet Access (HSPA) network, or an evolved HSPA (eHSPA+) network.

Access node 104 may perform radio access functions for connecting UE 102 with various communications networks and/or nodes. Access node 104 may communicate with core network 106 using gateway functionality. For example, access node 104 or other node (e.g., a gateway) may communicate messages (e.g., authentication or mobility related messages) to one or more nodes within the core network 106.

Core network 106 may be a network for providing services UE 102. For example, core network 106 may perform network aggregation, charging, and authentication functions for UE 102. In one embodiment, core network 106 may be at least one of a 3G network, a 3G+ network, a GSM network, a 4G network, an LTE network, an EPC network, a 3rd Generation Partnership Project (3GPP) network, a GPRS core network, or other network.

Core network 106 may include a policy and charging enforcement function (PCEF) 108 and a PCRF 110. Core network 106 may also include other nodes, such as SPRs 112, a Diameter relay agent and/or a Diameter signaling router (DRA/DSR), a mobility management entity (MME), a home subscriber server (HSS), an authentication, authorization, and accounting (AAA) server, and a bearer binding and event reporting function (BBERF).

PCEF 108 may be any suitable entity for generating and/or enforcing policies (e.g., one or more policy rules). For example, PCEF 108 may include functionality located at a gateway (e.g., a packet data network (PDN) gateway) or other node for communicating between networks, e.g., Internet 114. In one embodiment, PCEF 108 manages and enforces policy and charging control (PCC) rules provided by PCRF 110. For example, rules may be provided for each SDF and/or UE 102 attempting to use PCEF 108. In this example, PCEF 108 may control access to external networks and charge for such access based on rules received from PCRF 110.

In some embodiments, PCEF 108 may include or be integrated with a gateway GPRS support node (GGSN) for communicating between a GPRS network and external networks, e.g., Internet 126 or private network 128. For example, in an embodiment where core network 106 includes a GPRS core network, PCEF 108 may include a GGSN. PCEF 108 may communicate with serving GPRS support node (SGSN) or other gateway for providing services to UE 102. For example, PCEF 108 may request and receive PCC rules from PCRF 110. Using the PCC rules, PCEF 108 may control access to external networks and charge for such access based on the PCC rules. For example, for an SDF (e.g., one or more related packets) that is under policy control, PCEF 108 may allow the SDF to pass through the node if the corresponding gate is open (e.g., as determined by one or more relevant PCC rules). For an SDF that is under charging control, PCEF 108 may allow the SDF to pass through the node if there is a corresponding active PCC rule and, for online charging, the OCS has authorized the applicable credit with that charging key. PCEF 108 may let an SDF pass through the gateway during the course of the credit re-authorization procedure. If requested by PCRF 110, PCEF 108 may report to PCRF 110 when the status of the related SDF changes, which can be used to monitor an IP-CAN bearer path dedicated for AF signaling traffic.

PCEF 108 may also include a BBERF. The BBERF may be any suitable entity for performing bearer binding and/or event reporting. In one embodiment, the BBERF may control user plane traffic. For example, the BBERF may ensure that an SDF is carried over a bearer path with an appropriate quality of service and may perform resource reservation. The BBERF may also provide event reporting to one or more nodes in network 100. For example, the BBERF may inform PCRF 110 of various network or bearer-related events, e.g., based on event triggers installed or requested by PCRF 110.

PCRF 110 may be any suitable entity for creating, selecting, or otherwise determining policies (e.g., one or more PCC rules). For example, PCRF 110 may be a stand-alone node, e.g., a policy server or a multimedia policy engine (MPE), or may be co-located or integrated with one or more nodes in network 100, e.g., a DRA/DSR. PCRF 110 may inform PCEF 108, through the use of PCC rules, on the treatment of each SDF that is under PCC control, in accordance with policy decisions. In performing policy decisions, PCRF 110 may communicate with one or more nodes in network 100 for gathering subscription related information. For example, PCRF 110 may communicate with SPRs 112 to retrieve policy information. In another example, PCRF 110 may communicate with a network management system (NMS), e.g., via a simple network management protocol (SNMP) interface. In this example, PCRF 110 may poll or otherwise query the NMS or a related database to receive information, e.g., regarding the state of one or more devices in an access network, core network, or other network.

PCRF 110 may include and/or access storage (e.g., an SPR selection database) for determining appropriate SPRs 112 to query for policy information. For example, an SPR selection database may contain associations between various information (e.g., SDF information, device information, and subscriber information) and SPRs identifiers. PCRF 110 may consult or query such storage (e.g., using an SDF identifier from a policy request message as a lookup criterion) for appropriate SPRs 112. After selecting appropriate SPRs 112, query messages (e.g., a subscription profile (SP) request messages) may be sent to the appropriate SPRs 112.

Subscription related information may be used (e.g., by PCRF 110) to generate PCC rules. PCC rules typically include information for managing user plane traffic (e.g., data packets). For example, a PCC rule may include a rule name, service identifier, SDF filter(s), precedence information, gate status, QoS parameters, charging key (i.e., rating group), other charging parameters, and/or monitoring key. The rule name or PCC rule identifier may be used to reference a PCC rule in the communication between the PCEF and the PCRF and may be unique for each PCC rule used during an IP-CAN session. The service identifier may be used to identify the service or the service component to which the SDF relates. The SDF filter(s) may be used to select the traffic for which the rule applies. For example, an SDF filter make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). In this example, packets containing information matching the IP five-tuple may be considered part of the SDF for which the corresponding PCC rule is to be applied. In another example, an SDF filter may be based on fewer, different, and/or additional criteria. For instance, UE 102 or another node in network 100 may assign an SDF identifier (e.g., a value) to packets in a custom parameter field. In this instance, an SDF filter in a PCC rule may use this parameter for determining traffic for which the rule applies.

PCC policy decisions may be based on one or more of the following: information obtained from an AF via the Rx interface (e.g., session, media, and subscriber related information), information obtained from PCEF 108 (e.g., Internet Protocol Connectivity Access Network (IP-CAN) bearer attributes, request type, device information, and subscriber related information), information obtained from SPR (e.g., subscriber and service related data), and pre-configured information. If the information from PCEF 108 contains traffic mapping information not matching any SDF filter known to PCRF 110, and PCRF 110 allows the UE to request enhanced QoS for services not known to PCRF 110, PCRF 110 may add the traffic mapping information as SDF filters to the corresponding authorized PCC rule. PCRF 110 may wildcard missing filter parameters, e.g., missing uplink TFT address and port information in case of GPRS. For example, a blank or "wildcard" filter (e.g., port number="*") may consider any value (including an empty or zero value) as matching the filter criteria.

SPRs 112 represent suitable entities for storing or maintaining subscription related information, such as subscription profiles, policy information, and/or PCC rules. For example, SPRs 112 may include a database, an HSS, an AAA, or other node. SPRs 112 may store policy information for use by PCRF 110 in making policy decisions. In one embodiment, a subscription profile may include authorization information, charging information, subscription information (e.g., access or service tiers), and quality of service (QoS) information associated with a subscriber, session, device, and/or an SDF. For example, a subscription profile may include information on a subscriber's permitted services, service pre-emption priorities, allowed QoS, and charging related data information for different types of SDFs.

SPRs 112 may communicate with PCRF 110 and various other nodes, e.g., a HSS, an AAA, an MME and or a DRA/DSR. SPRs 112 may be located external to or distinct from PCRF 110 or may be co-located or integrated with PCRF 110. For example, some SPRs 112 may be located in various locations (e.g., networks) distinct from PCRF 110 and another SPR 112 may be co-located or integrated with PCRF 110 or another node in network 100.

SPRs 112 may store policy information based on SDFs. For example, each content delivery network may provision SPRs 112 based on SDFs or SDF identifiers. In this example, each SPR 112 may include policy information for particular SDF identifiers (e.g., one or more parameter values in a policy request message or a generated value based on the one or more parameter values) and/or subscriber identifiers (e.g., international mobile subscriber identities (IMSIs)). In another example, multiple SPRs (e.g., in a same network or associated with the same network) may be provisioned identically.

SPRs 112 may also store policy information based on additional and/or different information (e.g., device information and/or subscriber identifiers). For example, in network 100, SPRs 112 may be provisioned policy information based on device information and/or subscriber information and SDF information. For instance, policy information for users of 4G-capable smartphones may be stored in SPRs 1-3, while policy information for users of 3G-capable smartphones may be stored in SPRs 4-15 and policy information for top-tier data subscribers are stored in SPRs 16-20.

Policy information stored in SPRs 112 may be indexed by similar information (e.g., SDF identifiers, device information, and/or subscriber identifiers). For example, after selecting an appropriate SPR 112, PCRF 112 or a proxy (e.g., a message router) may send a query message to SPR 112. The query message may include a subscriber identifier and/or an SDF identifier. Using one or both of the identifiers from the query message, SPR 112 may determine corresponding policy information and provide the information to PCRF 110 or a proxy.

In some embodiments, an SPR 112 for a given network may only maintain policy information that is relevant for that network. For example, in contrast to conventional systems, an SPR 112 in accordance with embodiments of the present subject matter may store policy information solely related to a network's specific services, applications, and other resources. For instance, every SPR 112 in network 'A' may include policy information for all SDFs that may access network 'A' or use resources of network 'A' and every SPR 112 in network 'B' may include policy information for all SDFs that may access network 'B' or use resources of network 'B'. In this instance, multiple SPRs 112 may be selected and queried for relevant policy information associated with an SDF that accesses multiple networks (e.g., network 'A' and network 'B').

As stated above, an SPR may be selected based on an SDF identifier or identifiers. As such, policy information for a given subscriber may be distributed across plural SPRs 112. Storing policy information for a given subscriber in different SPRs 112 allows flexible assignment of policies to a subscriber. For example, policies may be assigned to subscribers based on the services requested and/or the networks being accessed.

It will be appreciated that FIG. 1 is for illustrative purposes and that various nodes, their locations, and/or their functions may be changed, altered, added, or removed. For example, some nodes and/or functions may be combined into a single entity, e.g., SPR 112 and PCRF 110 may be included in an MPE. In a second example, a node and/or function may be located at or implemented by two or more nodes.

Figure 2:
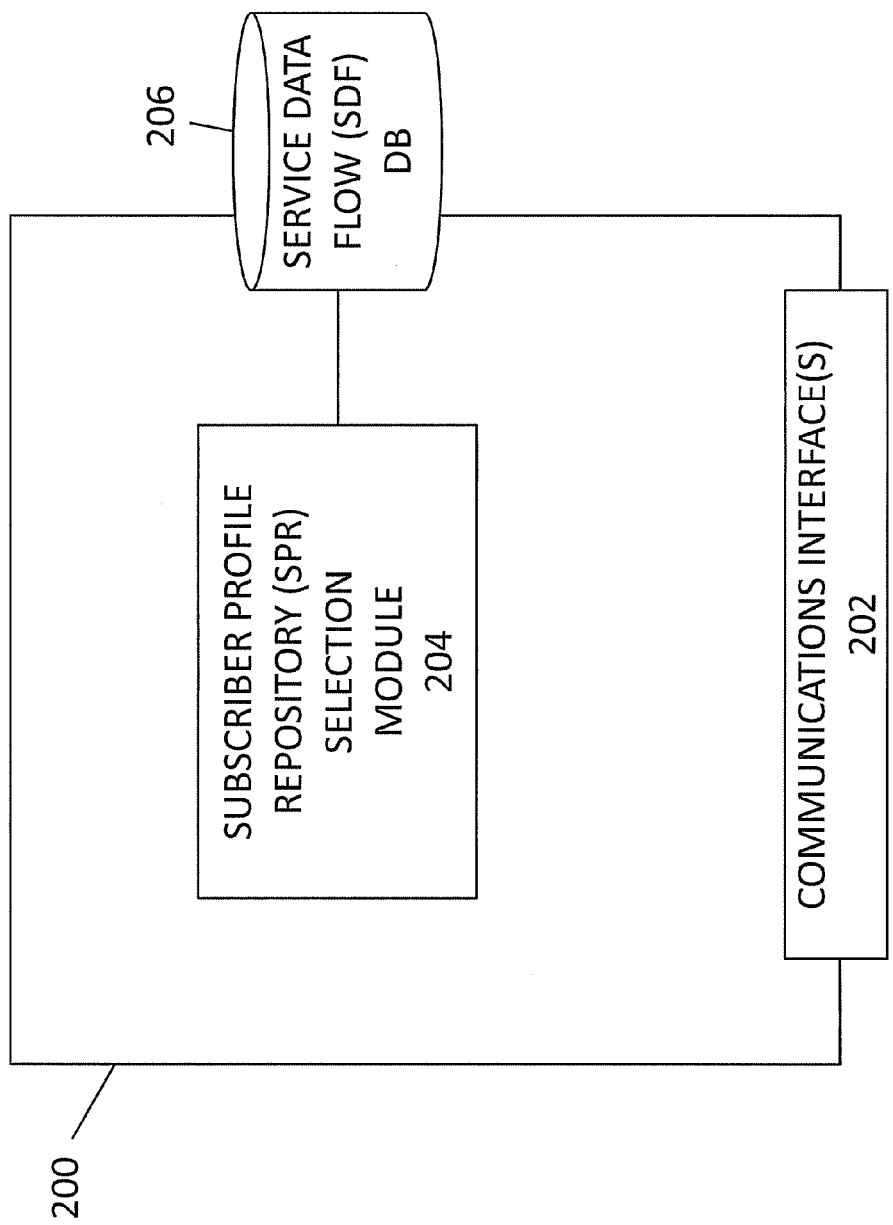
FIG. 2 is block diagram illustrating an exemplary node for SDF based SPR selection according to an embodiment of the subject matter described herein.

FIG. 2 is block diagram illustrating an exemplary node 200 for SDF based SPR selection according to an embodiment of the subject matter described herein. SPR selection node (SPRSN) 200 may be a stand-alone node or may be integrated with additional functionality or another node. For example, SPRSN 200 may be integrated with or include PCRF 110 or a DRA/DSR.

Referring to FIG. 2, SPRSN 200 may include one or more communications interfaces 202 for communicating messages (e.g., via a Gx interface, Gxx interface, Sp interface, an extensible markup language (XML) interface, a session initiation protocol (SIP) interface, a SOAP interface, or a hypertext transfer protocol (HTTP) interface or others). For example, where SPRSN 200 includes PCRF 110, a credit control request (CCR) may be received via a Gx interface from PCEF 108 for requesting policy information (e.g., PCC rules). In another example, SPRSN 200 may receive a policy request message via an HTTP or SIP interface from an IMS node. In yet another example, SPRSN 200 may include one or more interfaces (e.g., Sp, SOAP, or HTTP) for communicating with SPRs 112.

SPRSN 200 may include an SPR selection module 204 for selecting one or more SPRs 112. For example, SPR selection module 204 may inspect a received Gx message, or portion thereof, (e.g., a policy request message from PCEF 108) for SDF information. SPR selection module 204 may use SDF information (e.g., an SDF identifier) in selecting one or more SPRs 112. For example, SPR selection module 204 may query, using SDF information as lookup information, an SDF database 206 that stores SPR identifiers (e.g., universal resource identifiers (URI), FQDNs, and/or IP addresses usable to identify SPRs 112). SPR selection module 204 may select SPRs 112 identified based on the corresponding SPR identifiers.

As stated above, rather than selecting an SPR solely using a subscriber identifier, SDF information may be used alone or in combination with a subscriber identifier to identify an SDF. SDF information that may be utilized may include any information used or usable to identify an SDF. For example, SDF information may include an SDF identifier that is specific to a service or application, subscriber information, and device information. A message sent to SPRSN 200 may include an SDF identifier (e.g., a value or other indicator). In another example, SDF information (e.g., layer 3 and layer 7 information) in the message may be used to generate or compute an SDF identifier. An SDF identifier may be based on information about at least one of an Internet protocol (IP) address, a subscriber identifier, an application type, a host name, a content delivery network, a fully qualified domain name (FQDN), a service type, and a quality of service (QoS) type. In one example, a destination IP address and/or an application type or protocol type found in the message may be used to determine or assign an SDF identifier.

SPRSN 200 may access and/or store relevant SPR selection information in an SDF database 206. SDF database 206 may be integrated or co-located with SPRSN 200 or may be located at a node distinct from SPRSN 200. SDF database 206 may store information for selecting SPRs 112 based on various criteria. For example, database 206 may store associations between SDF identifiers and SPR identifiers. In another example, database 206 may store associations between subscriber identifiers, SDF identifiers, and SPR identifiers. In another example, database 206 may store associations between subscriber identifiers, device identifiers, and/or SDF identifiers and SPR identifiers.

SDF database 206 may be pre-configured (e.g., by an operator) or may retrieve or learn associations from another source (e.g., a master profile database). SDF database 206 may also update stored information based on event notifications, network conditions, and/or other messages. For example, if SPRSN 200 fails to receive a response back from an SPR 112 within a given period, SDF database 206 may update associations so as to replace the unresponsive SPR 112 with a secondary or backup SPR 112.

Exemplary SPR selection data that may be stored at or in SDF database 206 is shown below in Table 1. In Table 1, associations between subscriber identifiers, SDF identifiers, and SPR identifiers are shown. Table 1 includes three columns: 'Subscriber ID', 'Service Data Flow ID', and 'SPR ID'. Column 'Subscriber ID' includes various subscriber identifiers for identifying a subscriber associated with policy information, column 'Service Data Flow ID' includes various SDF identifiers for identifying a particular SDF, and column 'SPR ID' includes various SPR identifiers for identifying a particular SPR having policy information concerning a corresponding subscriber identifier and SDF identifier (e.g., the subscriber identifier and the SDF identifier in the same row as the SPR identifier).

TABLE 1

Exemplary Subscription Profile Repository (SPR) Selection Data

| Subscriber ID | Service Data Flow ID | SPR ID |
|---|---|---|
| Sub 1 | SDF x | SPR 1, SPR 3 |
| Sub 2 | SDF y | SPR 2 |
| Sub 1 | SDF z | SPR 2 |
| Sub 3 | SDF y | SPR 3 |

SPR selection module 204 may query SPR selection data when selecting one or more appropriate SPRs. For example, using a subscriber identifier and an SDF identifier as lookup criteria in Table 1, one or more SPR identifiers may be identified. Each SPR identifier may identify one or more SPRs 112 having relevant policy information associated with the SDF identifier and subscriber information. The relevant policy information may be used to generate appropriate policy decisions for the subscriber and the SDF corresponding to the subscriber identifier and the SDF identifier.

In another display of SPR selection data (shown below in Table 2), exemplary SPR selection data may include associations between SDF identifiers and SPR identifiers. Table 2 includes two columns: 'Service Data Flow ID', and 'SPR ID'. Column 'Service Data Flow ID' includes various SDF identifiers for identifying a particular SDF and column 'SPR ID' includes various SPR identifiers for identifying a particular SPR having policy information concerning a corresponding SDF identifier. In this example, using Table 2, an SDF identifier may be the sole lookup criteria for determining one or more SPR identifiers. Each SPR identifier may identify an SPR 112 having relevant policy information associated with the SDF identifier. The relevant policy information may be used to generate appropriate policy decisions for the SDF corresponding to the SDF identifier. If relevant policy information is obtained from multiple SPRs 112, policy decisions may be generated based on one or more portions of the relevant policy information.

TABLE 2

Exemplary Subscription Profile Repository (SPR) Selection Data

| Service Data Flow ID | SPR ID |
| --- | --- |
| SDF x | SPR 1, SPR 3 |
| SDF y | SPR 2 |
| SDF z | SPR 2 |
| SDF r | SPR 3 |

Figure 3:
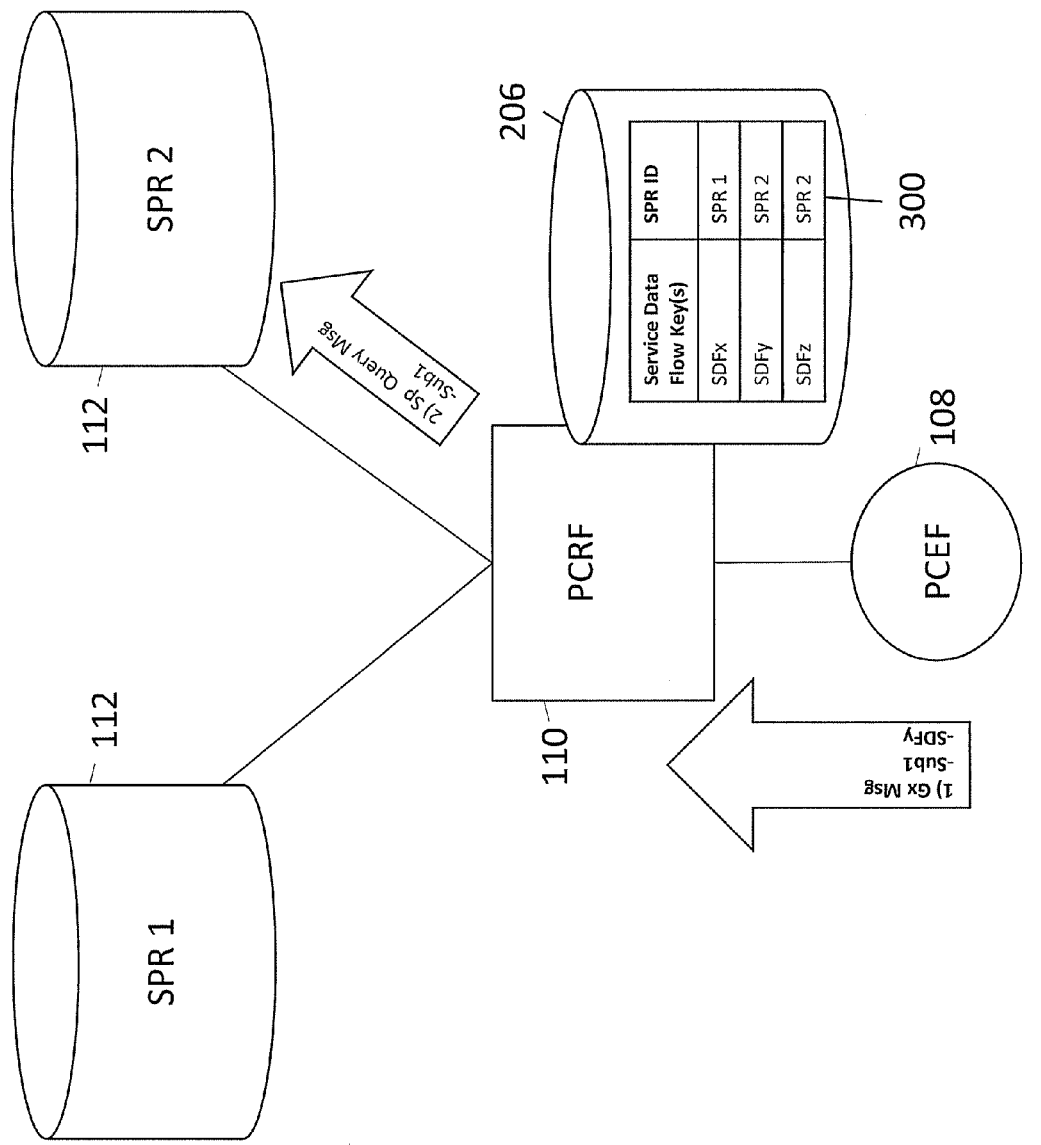
FIG. 3 is a message flow diagram illustrating selecting an SPR based on an SDF identifier according to an embodiment of the subject matter described herein.

FIG. 3 is a message flow diagram illustrating selecting an SPR based on an SDF identifier according to an embodiment of the subject matter described herein. In this embodiment, PCEF 108 may establish a session for subscriber ID 1 through an IP Connectivity Access Network (e.g., a WLAN). IP-CAN is a collection of network entities and interfaces that provides IP transport connectivity between UEs and core network entities. In one exemplary IP-CAN session establishment scenario, PCEF 108 may receive an IP-CAN session creation request. The IP-CAN session creation request may be a GTP message or a trigger message.

In response to the IP-CAN session creation request, in step 1, PCEF 108 (e.g., PDN gateway or GGSN) may send a Gx message to PCRF 110 (e.g., a policy server). For example, the Gx message may be any message, such as a CCR message, communicated via a Gx interface for requesting policies to be applied to the IP-CAN session. The Gx message may be for requesting PCC rules and may include a subscriber identifier and SDF information, e.g., an SDF identifier. In an alternate embodiment, in step 1, a policy request message may be sent to PCRF 110 via another interface, such as a SIP, a SOAP, or an HTTP interface.

PCRF 110 may receive the message and, using the SDF information, e.g., an SDF identifier, may query SDF database 206 for an SPR identifier. For example, PCRF 110 may obtain or derive an SDF identifier (e.g., 'SDFy') from the Gx message. In this example, PCRF 110 may, using the SDF identifier as an index or a key, perform a lookup in SPR selection table 300 for a corresponding SPR identifier. After obtaining an appropriate SPR identifier, PCRF 110 may generate a message for querying SPR 112 associated with the SPR identifier. The generated message may include information, such as the subscriber identifier, from the Gx message.

In step 2, an SP query message (e.g., a profile request message) may be sent from PCRF 110 to SPR 2 112. For example, an SP query message may be any query message communicated via an Sp interface. The Sp query message may be for requesting relevant policy information (e.g., minimum or maximum bit rates or other QoS information). In an alternate embodiment, in step 2, this query message may be sent to SPR 2 112 via another interface, such as a SIP, a SOAP, or an HTTP interface.

SPR 2 112 may receive the Sp query message and, using the information in the Sp query message, may obtain policy information. For example, SPR 2 112 may index stored policy information by subscriber identifiers. In this example, using a subscriber identifier from a received Sp query message, SPR 2 112 may retrieve corresponding policy information. SPR 2 112 may send a response or answer message (e.g., a profile answer message) containing the corresponding policy information towards PCRF 110. PCRF 110 may receive the policy information, generate a policy based on the policy information, and apply the policy. For example, PCRF 110 may send PCC rules to PCEF 108, and PCEF 108 may enforce the PCC rules. For instance, packets associated with an SDF may be policed according to PCC rules that correspond to the SDF (e.g., as determined by matching SDF filters in the PCC rules).

Applying a policy may be part of either a PULL or a PUSH procedure. A PULL procedure may occur when provisioning is solicited by PCEF 102. For example, in response to a request for PCC rules being made by PCEF 108, PCRF 110 may provision PCC rules using a credit control answer (CCA) message. A PUSH procedure may occur when provisioning is unsolicited. For example, PCRF 110 may decide to provision PCC rules without obtaining a request from PCEF 108, e.g., in response to information provided to PCRF 110 from an AF via the Rx interface, or in response to an internal trigger within PCRF 110. In order to provision PCC rules without a request from PCEF 102, PCRF 110 may include the PCC rules in a re-authentication request or answer message.

Figure 4:
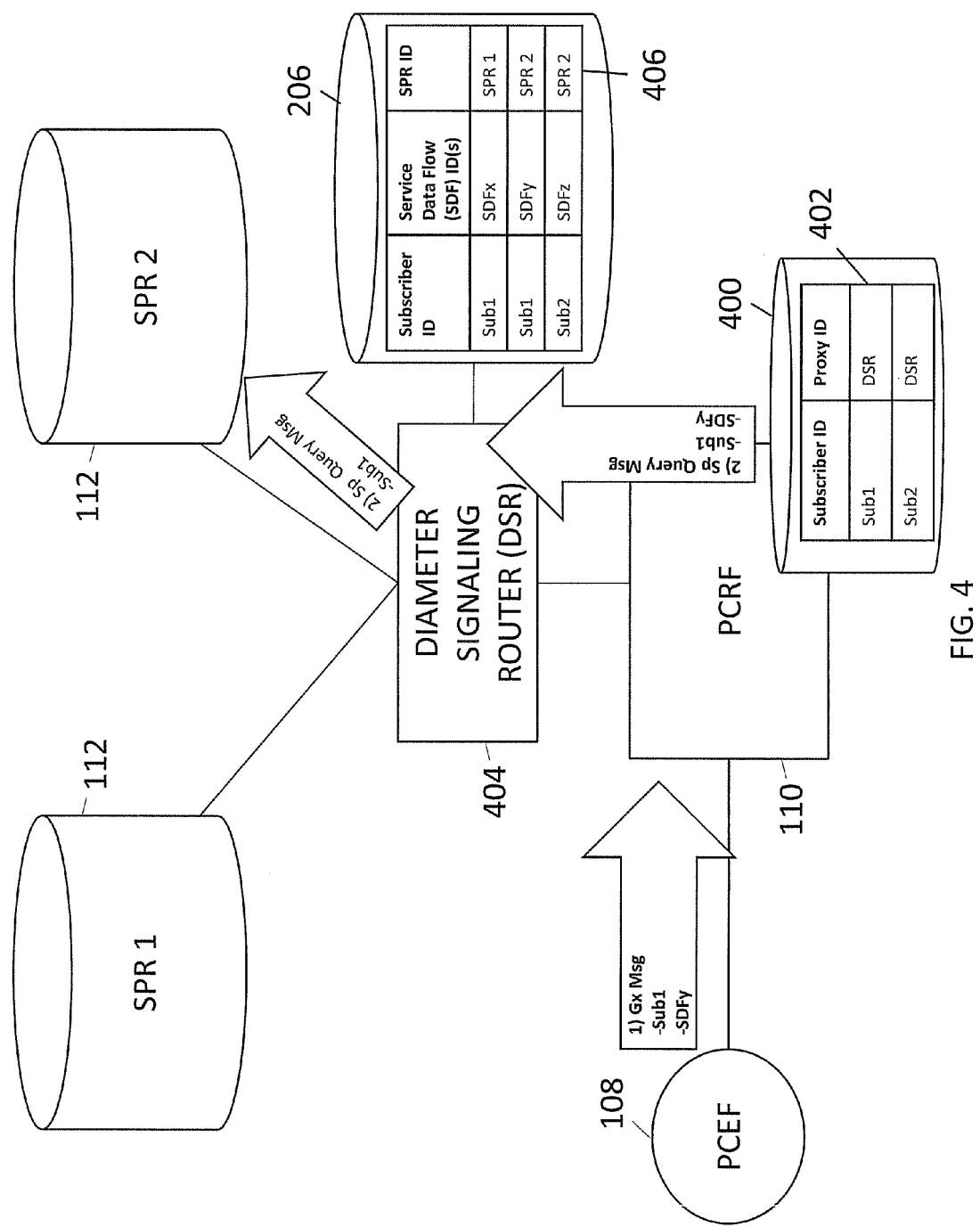
FIG. 4 is a message flow diagram illustrating selecting an SPR based on an SDF identifier according to another embodiment of the subject matter described herein.

FIG. 4 is a message flow diagram illustrating selecting an SPR based on an SDF identifier according to another embodiment of the subject matter described herein. In this embodiment, a proxy is used to communicate Diameter signaling messages between PCRF 110 and SPRs 112. The proxy may include functionality for selecting an SPR 112 based on an SDF identifier (e.g., an SPR selection module 204 and an SDF database 206). In one example, the proxy may be a message router, such as DRA/DSR 404. DRA/DSR 404 may be any suitable entity for routing or relaying Diameter signaling messages routing between Diameter nodes. For example, DRA/DSR 404 may be an LTE signaling router, an LTE Diameter signaling router, a Diameter signaling agent, a Diameter proxy, a Diameter routing agent, or a Diameter redirect agent.

DRA/DSR 404 may communicate with SPRs 112 and other nodes via one or more signaling interfaces. For example, DRA/DSR 404 may exchange or communicate messages between SPR 2 112 via one or more LTE Sp interfaces. In a second example, DRA/DSR 404 may exchange or communicate messages between SPR 2 112 via an HTTP interface, an XML interface, or another interface.

In step 1 in FIG. 4, PCEF 108 may send a Gx message to PCRF 110. The Gx message may be for requesting PCC rules and may include a subscriber identifier and SDF information, e.g., an SDF identifier. In an alternate embodiment, in step 1, a policy request message may be sent to PCRF 110 via another interface, such as a SIP, a SOAP, or an HTTP interface.

PCRF 110 may receive the message and, using the subscriber identifier, may query a proxy database 400 for a proxy identifier. For example, PCRF 110 may obtain the subscriber identifier (e.g., 'Sub1') from the Gx message. In this example, PCRF 110 may query, using the subscriber identifier as an index lookup, a proxy selection table 402 for a corresponding proxy identifier. After obtaining an appropriate proxy identifier, PCRF 110 may generate a message for querying SPR 112 via the identified proxy (e.g., DRA/DSR 400). The generated message may include information, such as the subscriber identifier and the SDF identifier, from the Gx message.

In step 2, an SP query message may be sent from PCRF 110 to DRA/DSR 404. For example, the Sp query message may be any query message communicated via an Sp interface. The Sp query message may be for requesting relevant policy information (e.g., minimum or maximum bit rates or other QoS information). In an alternate embodiment, in step 2, this query message may be sent to DRA/DSR 404 via another interface, such as a SIP, a SOAP, or an HTTP interface.

DRA/DSR 404 may receive the message and, using the subscriber identifier and/or the SDF information, may query SDF database 206 for an SPR identifier. For example, DRA/DSR 404 may obtain the subscriber identifier (e.g., 'Sub1') and the SDF information (e.g., 'SDFy') from the Gx message. In this example, DRA/DSR 404 may query, using the subscriber identifier and the SDF information as indices or keys, an SPR selection table 406 for a corresponding SPR identifier. Based on the SPR identifier, DRA/DSR 404 may modify the Sp query message and relay the modified Sp query message to SPR 2 112. The generated message may include information, such as the subscriber identifier, from the Gx message. In some embodiments where the received message at DRA/DSR 404 is not an Sp query message, DRA/DSR 404 may generate an Sp query message or other appropriate query message for requesting policy information and may send the generated message to the appropriate SPR 112.

SPR 2 112 may receive the Sp query message and, using the information in the Sp query message, may obtain policy information. SPR 2 112 may send a response or answer message containing the corresponding policy information towards DRA/DSR 404 or PCRF 110. DRA/DSR 404 may relay the answer message to PCRF 110. PCRF 110 may receive the policy information, generate a policy based on the policy information, and apply the policy. For example, PCRF 110 may send PCC rules to PCEF 108 and PCEF 108 may enforce the PCC rules.

Figure 5:
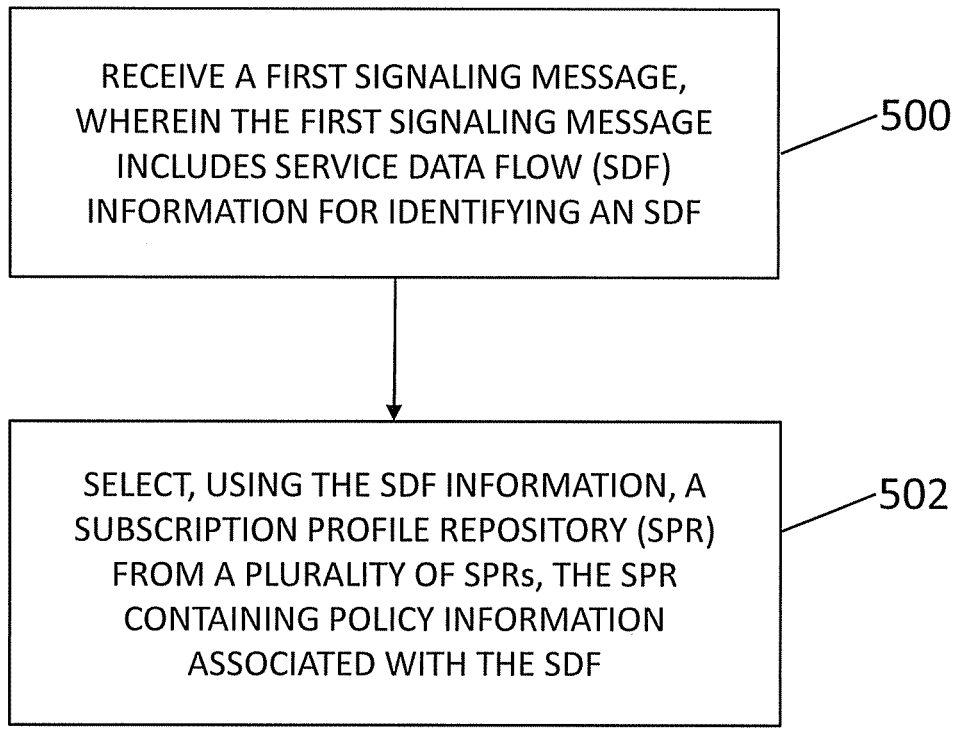
FIG. 5 is flow chart illustrating exemplary steps for SDF based subscription profile repository selection according to an embodiment of the subject matter described herein.

FIG. 5 is a flow chart illustrating an exemplary process for SDF based SPR selection according to an embodiment of the subject matter described herein. In some embodiments, the exemplary process described herein, or portions thereof, may be performed by SPRSN 200, a PCRF 110, and/or DRA/DSR 400.

Referring to FIG. 5, in step 500, a first signaling message may be received. The first signaling message may include SDF information for identifying an SDF. For example, a Diameter CCR-I message may be sent from PCEF 108 and received at PCRF 110. The CCR-I message may include an SDF identifier. The SDF identifier may indicate that the policy information requested is for packets associated with a particular application and/or service, e.g., a voice over Internet protocol (VoIP) call between users of different networks.

In step 502, one or more SPRs 112 may be selected using the SDF information. The SPR may contain policy information associated with the SDF. For example, PCRF 110 may use an SDF identifier in a received CCR-I message to determine which SPRs 112 should be queried for relevant policy information. For instance, PCRF 110 may query SPR selection table 300 in SPR selection database 206 using an SDF identifier. The SPR selection table 300 may include SPR identifiers indexed by or associated with SDF identifiers. After selecting and querying one or more appropriate SPRs 112, relevant policy information from the one or more appropriate SPRs 112 may be obtained by PCRF 110.

PCRF 110 may use the obtained policy information, or portion thereof, to generate PCC rules or policy decisions. For example, if policy information is received from multiple SPRs 112, the policy information may be correlated in ways consistent with business relationships between the networks managing the SPRs 112 from which the policy information is gleaned. For instance, if packets associated with an SDF are to travel between three networks and relevant policy information (e.g., from an SPR 112 in each network) is obtained, PCRF 110 may generate and apply a PCC rule that restricts the SDF to a bit rate that is acceptable in all three networks.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for service data flow (SDF) based subscription profile repository (SPR) selection, the method comprising:
   at a policy and charging rules function (PCRF) or a Diameter signaling router (DSR):
   receiving a first signaling message, wherein the first signaling message includes SDF information for identifying a first SDF and a subscriber; and
   selecting, using the SDF information, a first SPR from a plurality of SPRs, wherein policy information for a given subscriber is distributed across different SPRs of the plurality of SPRs, the first SPR containing policy information associated with the first SDF, wherein a second SPR of the plurality of SPRs contains policy information associated with a second SDF that is different from the policy information contained in the first SPR.

2. The method of claim 1 comprising:
   obtaining, from the first SPR, the policy information; and
   applying, using the policy information, a policy to the first SDF.

3. The method of claim 1 wherein the SDF information includes at least one of an SDF identifier that is specific to a service or application, subscriber information, and device information.

4. The method of claim 2 wherein obtaining, from the first SPR, the policy information includes generating a second signaling message, wherein the second signaling message includes at least a portion of the SDF information and sending the second signaling message to the first SPR.

5. The method of claim 2 wherein applying a policy includes pushing a policy rule to a policy and charging enforcement function (PCEF) that serves an associated subscriber.

6. The method of claim 2 wherein applying a policy includes pulling, by a policy and charging enforcement function (PCEF) that serves an associated subscriber, a policy rule from the PCRF, wherein pulling the policy rule includes querying the PCRF for the policy rule.

7. The method of claim 2 wherein selecting an SPR includes selecting two or more SPRs from the plurality of SPRs, wherein obtaining the policy information includes obtaining, from the two or more SPRs, the policy information, and wherein applying a policy to the SDF includes generating a policy rule based on the policy information obtained from the two or more SPRs.

8. The method of claim 1 wherein selecting, using the SDF information, an SPR from a plurality of SPRs is performed by one of a policy and charging rules function (PCRF), a message router, a Diameter signaling router (DSR), or a proxy.

9. The method of claim 3 wherein the SDF identifier is based on information about at least one of an Internet protocol (IP) address, a subscriber identifier, an application type, a host name, a content delivery network, a fully qualified domain name (FQDN), a service type, and a quality of service (QoS) type.

10. The method of claim 1 wherein the SPR comprises one of a database, a home subscriber server (HSS), or an authentication authorization and accounting (AAA) server.

11. The method of claim 1 wherein at least some of the plurality of SPRs include policy information specific to a content delivery network associated with the SDF.

12. A system for service data flow (SDF) based subscription profile repository (SPR) selection, the system comprising:
 a policy and charging rules function (PCRF) or a Diameter signaling router (DSR), the PCRF or the DSR comprising:
  a communications interface configured to receive a first signaling message, wherein the first signaling message includes SDF information for identifying a first SDF; and
  an SPR selection module configured to select, using the SDF information, a first SPR from a plurality of SPRs, wherein policy information for a given subscriber is distributed across different SPRs of the plurality of SPRs, the first SPR containing policy information associated with the first SDF, wherein a second SPR of the plurality of SPRs contains policy information associated with a second SDF that is different from the policy information contained in the first SPR.

13. The system of claim 12 wherein the system is configured to obtain, from the first SPR, the policy information and apply, using the policy information, a policy to the first SDF.

14. The system of claim 12 wherein obtaining, from the first SPR, the policy information includes generating a second signaling message, wherein the second signaling message includes at least a portion of the SDF information and sending the second signaling message to the first SPR.

15. The system of claim 13 wherein applying a policy includes pushing a policy rule to a policy and charging enforcement function (PCEF) that serves an associated subscriber.

16. The system of claim 13 wherein applying a policy includes pulling, by a policy and charging enforcement function (PCEF) that serves an associated subscriber, a policy rule from the PCRF, wherein pulling the policy rule includes querying the PCRF for the policy rule.

17. The system of claim 12 wherein the SPR selection module is configured to select two or more SPRs from the plurality of SPRs, obtain, from the two or more SPRs, the policy information, and generate a policy rule based on the policy information obtained from the two or more SPRs.

18. The system of claim 12 wherein the SDF information includes information about at least one of an Internet protocol (IP) address, a subscriber identifier, an application type, a host name, a content delivery network, a fully qualified domain name (FQDN), a service type, and a quality of service (QoS) type.

19. The system of claim 12 wherein the first SPR comprises one of a database, a home subscriber server (HSS), or an authentication authorization and accounting (AAA) server.

20. The system of claim 13 wherein at least some of the plurality of SPRs include policy information specific to a content delivery network associated with the SDF.

21. A non-transitory computer readable medium comprising computer executable instructions that when executed by a processor of a computer control the computer to perform steps comprising:
 at a policy and charging rules function (PCRF) or a Diameter signaling router (DSR):
  receiving a first signaling message, wherein the first signaling message includes service data flow (SDF) information for identifying a first SDF and a subscriber; and
  selecting, using the SDF information, a first subscription profile repository (SPR) from a plurality of SPRs, wherein policy information for a given subscriber is distributed across different SPRs of the plurality of SPRs, the first SPR containing policy information associated with the first SDF, wherein a second SPR of the plurality of SPRs contains policy information associated with a second SDF that is different from the policy information contained in the first SPR.

* * * * *